United States Patent
Holzheu

(10) Patent No.: US 7,677,611 B2
(45) Date of Patent: Mar. 16, 2010

(54) FLANGED JOINT

(75) Inventor: Peter Holzheu, Königsbrunn (DE)

(73) Assignee: Fey Lamellenringe GmbH & Co., KG, Konigsbrunn (DE)

( * ) Notice: Subject to any disclaimer, the term of this patent is extended or adjusted under 35 U.S.C. 154(b) by 626 days.

(21) Appl. No.: 10/576,869

(22) PCT Filed: Sep. 25, 2004

(86) PCT No.: PCT/DE2004/002143

§ 371 (c)(1),
(2), (4) Date: Mar. 8, 2007

(87) PCT Pub. No.: WO2005/044661

PCT Pub. Date: May 6, 2005

(65) Prior Publication Data

US 2007/0267868 A1    Nov. 22, 2007

(30) Foreign Application Priority Data

Oct. 23, 2003    (DE) .............. 203 16 372 U

(51) Int. Cl.
*F16L 23/00*    (2006.01)
(52) U.S. Cl. ............ 285/368; 285/412; 285/351; 277/602
(58) Field of Classification Search .......... 285/351, 285/318, 224, 364, 365, 366, 367, 368, 412, 285/95, 332.2, 363; 277/602, 603, 609, 610, 277/630, 632
See application file for complete search history.

(56) References Cited

U.S. PATENT DOCUMENTS

| | | | | | |
|---|---|---|---|---|---|
| 1,820,644 | A | * | 8/1931 | Bach | 279/99 |
| 1,825,962 | A | * | 10/1931 | Laird | 277/614 |
| 2,202,492 | A | * | 5/1940 | Jacocks | 285/340 |
| 4,198,076 | A | * | 4/1980 | Mezei | 285/18 |
| 4,429,905 | A | * | 2/1984 | Valentine | 285/93 |
| 4,438,957 | A | * | 3/1984 | Williams et al. | 285/223 |
| 5,141,448 | A | * | 8/1992 | Mattingly et al. | 439/314 |
| 5,197,766 | A | * | 3/1993 | Glover et al. | 285/14 |
| 5,427,386 | A | * | 6/1995 | Breaker | 277/627 |
| 5,460,459 | A | * | 10/1995 | Morgan | 403/350 |
| 5,542,681 | A | * | 8/1996 | Hutchens et al. | 277/539 |
| 5,934,680 | A | * | 8/1999 | Kakehi et al. | 277/499 |
| 6,059,323 | A | * | 5/2000 | Ekholm et al. | 285/224 |
| 6,299,219 | B1 | * | 10/2001 | Hoegger | 285/190 |
| 6,443,502 | B1 | * | 9/2002 | Iida et al. | 285/351 |
| 6,863,277 | B2 | * | 3/2005 | Wirth et al. | 277/434 |
| 7,434,849 | B2 | * | 10/2008 | Takeuchi et al. | 285/347 |

* cited by examiner

*Primary Examiner*—Daniel P Stodola
*Assistant Examiner*—Gwendolyn Fournet
(74) *Attorney, Agent, or Firm*—Barnes & Thornburg LLP

(57) ABSTRACT

A flanged joint for a pressure medium. The flanged joint includes a first component and a second component having an interior. Also included is at least one flat gasket held between facing surfaces of the first and second components. An annular groove and a radially opposed working diameter are located between the interior and the at least one flat gasket. At least one lamella ring is held in the annular groove and biased, essentially without a gap, against the working diameter.

12 Claims, 3 Drawing Sheets

FLANGED JOINT

BACKGROUND AND SUMMARY

The present disclosure relates to a flanged joint. The flanged joint comprises at least one flat gasket held between the facing flange surfaces of components, such as lines or container parts, which store or guide a pressurized medium.

Such flanged joints are known from the prior art, wherein the flat gasket has the function of sealing the flanged joint as hermetically as possible with respect to the environment. Sealing the flanged joint with little or no leakage of environmentally hazardous media, such as oils, acids or toxic gases, is becoming ever more important in view of increased environmental consciousness and legal regulations, such as the TA 2003 air regulation or the VDI 2440 standard.

Such flanged joints often have a drawback in that, due to the continuous contact with the aggressive and/or high-temperature media guided through the lines or stored in the containers, the flat gaskets decompose or dissolve and have to be replaced after a certain amount of time, which adds to personnel overhead.

The present disclosure, thus, relates to a flanged joint having at least one flat gasket that has an increased service life and is essentially maintenance free.

The present disclosure relates to a flanged joint for a pressure medium. The flanged joint includes a first component and a second component having an interior. Also included is at least one flat gasket held between facing surfaces of the first and second components. An annular groove and a radially opposed working diameter are located between the interior and the at least one flat gasket. At least one lamella ring is held in the annular groove and biased, essentially without a gap, against the working diameter.

The present disclosure thus includes, as noted above, arranging, upstream of the at least one flat gasket in the direction of the pressure difference from the pressure side to the environment side, at least one lamella ring that is held in an annular groove. The at least one lamella ring is biased, essentially without a gap, against a working diameter radially opposing the annular groove. In the context of a lamella ring, the working diameter means the diameter of a surface facing the annular groove which receives the lamella ring and along which surface the pressurized medium would flow due to the pressure difference from the pressure side to the environment side.

The biasing of the lamella ring serves to provide sealing, without a gap, with respect to the working diameter, while a small gap is left toward the bottom of the annular groove. The effect of such a lamella ring is, therefore, the same effect as with gap or labyrinth seals. That is, the lamella ring deflects the flow away from the working diameter toward the bottom of the groove and forms a throttle there due to the small leftover gap, at which leftover gap pressure energy is lost. Due to flow redirection and throttling by the lamella ring, a high pressure level is reduced to a low level and the flow is diminished along the working diameter.

The lamella ring acts as a protective seal for the flat gasket downstream and protects it against wear, in particular against high pressures, high temperatures and aggressive media, such as acids or toxic gases. Such lamella rings are made of a thin steel band or of a different material, are structurally simple and require only a small amount of structural space in both axial and radial directions. This is why they are simple to retrofit in existing flanged joints. They are also heat resistant and break resistant, which is why they are highly suitable for protecting the downstream flat gasket against aggressive and high-temperature media.

By providing the lamella rings according to the present disclosure, the service life of the flat gaskets can be considerably increased. In view of the fact that in industrial plants and in the manufacture of chemical equipment, there is often a great number of flanged joints, maintenance overhead and costs can be substantially reduced by the flanged joint of the present disclosure.

The lamella rings of the present disclosure are held in the annular groove with a small axial play allowing for heat expansion.

According to an illustrative embodiment, a plurality of lamella rings can be axially arranged in the annular groove in series. This illustrative embodiment provides that, in view of the multiple labyrinthine redirection of the flow of the pressurized medium, of the plurality of lamella rings, at least the lamella ring facing the pressure side and the lamella ring facing the environment side are biased against the working diameter, and at least one lamella ring axially arranged between these lamella rings is biased against the bottom of the annular groove. As a consequence, in the manner of a labyrinth seal, the medium will be redirected several times between the individual lamella rings, which causes eddies and frictional losses and therefore uses up pressure energy, which advantageously increases the sealing effect. Generally, lamella rings of the same type are used for the lamella rings arranged in the annular groove.

According to the present disclosure, one or more single-turn lamella rings with an axial abutment opening and made of a steel band extending in a single plane are used, for example. Such single-turn lamella rings can be made at particularly low cost and their biasing against the bottom of the groove or against the working diameter is easily adjustable in advance.

Alternatively, according to the present disclosure, single-turn disk-like lamella rings of a steel band formed in the manner and form of a disk spring, can be inserted in the annular groove. Due to the inclination of the lamella rings, the edges of the steel band can be biased against the groove surfaces of the annular groove in a sealing fashion, which also results in an improved sealing effect. It is advantageous for at least one pair of two disk-like lamella rings opposing each other with respect to their disk-like form, to be used, because in this case there are two such sealing edges.

According to another illustrative embodiment, double-turn lamella rings are used, wherein the ends of the double-turns, in a relaxed state of the double-turn lamella ring, protrude to the inside or to the outside of the circular form provided by the remainder of the double-turn lamella ring, and are in alignment with the circular form in the stressed state of the double-turn lamella ring. The ends protruding inside or outside of the circular form ensure that the double-turns are biased toward the inside and toward the outside in the inserted state. The circular form of the closed double-turn over 360° ensures firm contact with the bottom of the groove or with the working diameter.

The two components joined by the flanged joint have a radially overlapping area, so that one of the components has an axially protruding annular collar engaging a complementary annular recess of the other component, which has its radially inner circumferential surface forming the working diameter. Thus, an annular groove radially open toward the outside can be formed in the axially protruding annular collar of the one component, which receives the lamella ring(s).

Other aspects of the present disclosure will become apparent from the following descriptions when considered in conjunction with the accompanying drawings.

DETAILED DESCRIPTION

Figure 1:
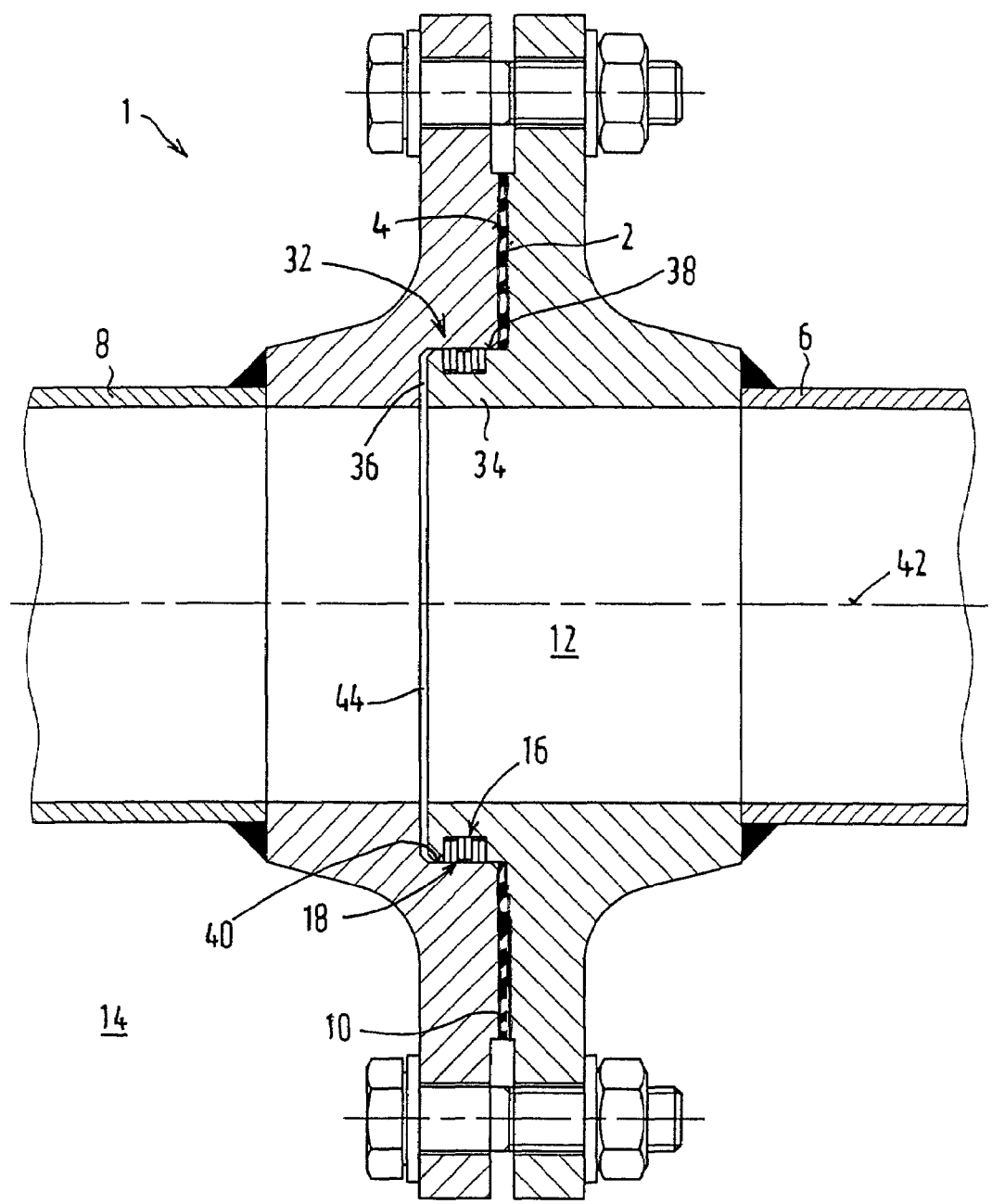
FIG. 1 is a cross-sectional view of a flanged joint, according to the present disclosure, showing three double-turn lamella rings axially arranged in series.

FIG. 1 shows an illustrative embodiment of a flanged joint 1 according to the present disclosure. Flanged joint 1 comprises a flat gasket 10 held between facing planar flange surfaces 2, 4 of two components 6, 8 which store or guide a pressurized medium. The components 6, 8 are, for example, cylindrical gas tubes or lines, wherein a gas has a higher pressure than an environmental pressure. However, differently configured flanged joints are conceivable, such as for mounting container components. The flanged joint 1 can be fixed or moveable, such as with rotating tubes. Flat gasket 10, for example, as a hermetic seal, prevents any gas from leaking from an interior 12 of the tubes 6, 8.

Figure 5:
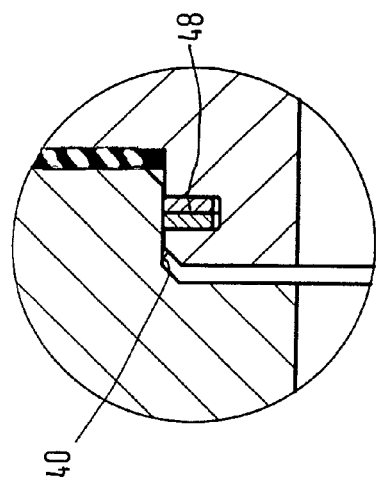
FIG. 5 is an enlarged partial cross-section detail of a portion of FIG. 1.

According to the present disclosure, upstream in a direction from a higher pressure of a pressure side on the inside 12 of tubes 6, 8 toward a lower pressure on an environment side 14 of flat gasket 10, at least one lamella ring 18 is held in an annular groove 16 and biased in an essentially gapless manner with respect to a facing of working diameter 40. Such an arrangement is facilitated by having one or more of the lamella rings 18 in annular groove 16 arranged parallel to a plane of flange surfaces 2, 4 with little axial play. As shown in FIG. 5, three double-turn lamella rings 20, 22, 24, are axially arranged in series in annular groove 16.

Double-turn lamella rings 20, 22, 24 each include two superimposed layers of a steel band of constant width or of a band of a different metal. The steel material is preferably C75, CK60 grade spring steel or a No. 1.4310, No. 1.4571 or No. 1.4980 chromium nickel steel.

Figure 4:
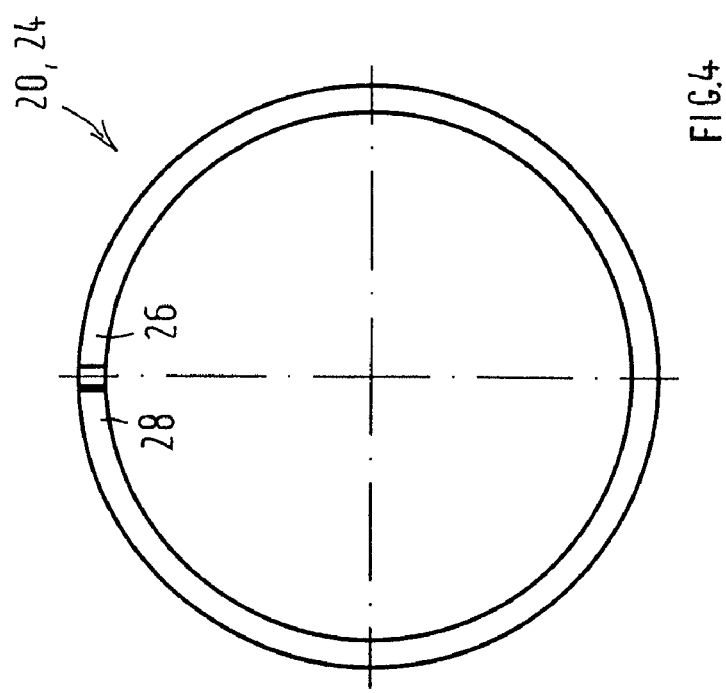
FIG. 4 is a top view of the double-turn lamella ring of FIG. 2 in the biased state.
Figure 2:
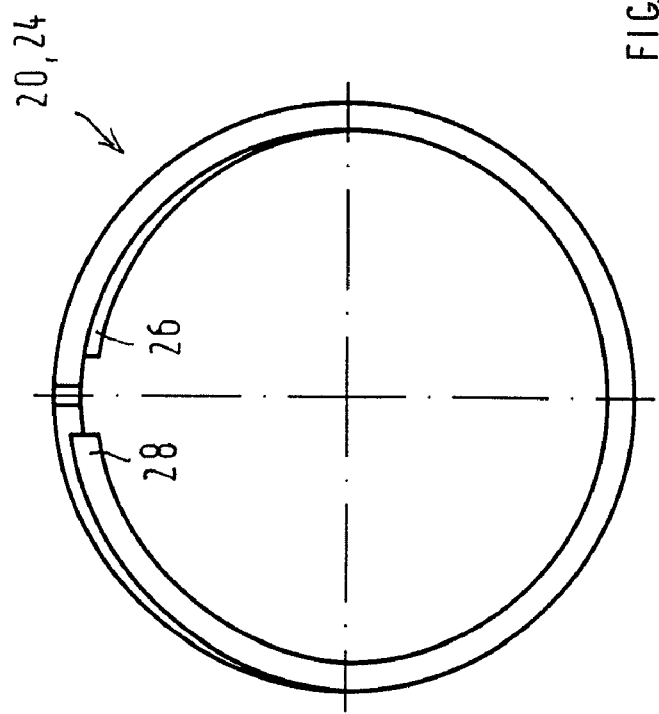
FIG. 2 is a top view of one of the double-turn lamella rings of FIG. 1 in a relaxed state.

FIG. 5 shows, for example, double-turn lamella ring 20 facing the pressure side, biased against working diameter 40 and therefore toward the outside, which is identical to double-turn lamella ring 24 facing the environment side 14. With such double-turn lamella rings 20, 24 biased radially toward the outside, free ends 26, 28 of the double-turns, departing from a circular form of, for example, the rest of double-turn lamella ring 20, protrude toward an inside in a relaxed state of double-turn lamella ring 20, 24, as shown in FIG. 2. Ends 26, 28 protruding toward the inside will ensure that the double-turns of double-turn lamella rings 20, 24 in an inserted state are biased radially toward the outside, against working diameter 40, and essentially without a gap. In the biased or inserted state of double-turn lamella rings 20, 24, ends 26, 28 will then be aligned with the circular form, as shown in FIG. 4.

With double-turn lamella ring 22 biased toward a bottom of annular groove 16 (see FIG. 5), the free ends (not shown) of the double-turns of lamella ring 22 protrude toward the outside, departing from a circular form of the rest of double-turn lamella ring 22 in a relaxed state of double-turn lamella ring 22. Free ends of lamella ring 22 protruding toward the outside ensure that the double-turns of double-turn lamella ring 22 are biased radially toward the inside, against the bottom of annular groove 16, in the inserted state, essentially without a gap.

Figure 3:
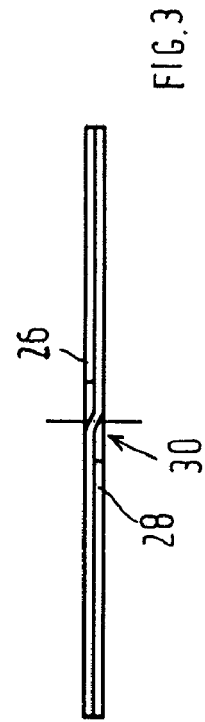
FIG. 3 is a side view of the double-turn lamella ring of FIG. 2.

In order to achieve continuous, flat end faces without steps, each of the steel bands of double-turn lamella rings 20, 22, 24 has an offset 30 in an area of free ends 26, 28 (FIG. 3).

As shown in FIG. 1, the two tubes 6, 8 have a radially overlapping area 32 in such a way that one of the tubes, for example, tube 6, has an axially protruding annular collar 34 engaging a complementary, annular recess 36 of the other tube 8. To accommodate the three double-turn lamella rings 20, 22, 24, annular groove 16 is formed in axially protruding annular collar 34 of one of the tubes, for example, tube 6, and radially open toward the outside. A radially outward circumferential surface 38 of annular collar 34 and a radially inner circumferential surface or working diameter 40 of recess 36 are on cylindrical surfaces which are coaxial with a tube axis 42. End faces of annular collar 34 of tube 6 are spaced from an annular bottom surface of recess 36 of tube 8 creating a small gap 44 allowing for thermal expansion of tubes 6, 8 in an axial direction.

In the context of lamella rings 18, the working diameter 40, for example, is a diameter of a surface facing annular groove 16 which receives the lamella ring(s) 18 and along which the pressurized medium would flow due to the pressure difference from the pressure side to the environment side. In the present disclosure, the radially inner circumferential surface 40 of recess 36 of tube 8 thus forms the working diameter 40 against which double-turn lamella rings 20, 24 are radially biased.

Circumferential surfaces of double-turn lamella rings 20, 22, 24 face either toward the bottom of annular groove 16 or toward working diameter 40. A gap 46 is formed in a space between the rings 20, 22, 24 and either the bottom of annular groove 16 or working diameter 40, as shown in FIG. 5. In this way, a labyrinth seal is formed. The gas guided under pressure in interior 12 of tubes 6, 8 is applied to radial gap 44, and in particular to double-turn lamella ring 20 facing the pressure side and biased against the working diameter 40. Due to the alternating arrangement of double-turn lamella rings 20, 22, 24, (see FIG. 5), wherein lamella rings 20, 24, are biased toward the outside against working diameter 40 and lamella ring 22 is biased toward the inside against the bottom of annular groove 16, a sequence of gap 46 (inside, outside, inside) results in flow redirections that are mainly in a radial direction. This achieves substantial throttling or pressure loss, so that only a very small amount and sometimes no gas at all passes along working diameter 40 to flat gasket 10.

To achieve such a labyrinthine redirection with the plurality of lamella rings 20, 22, 24 axially arranged in sequence, it is advantageous that, of the plurality of lamella rings 20, 22, 24 axially arranged in series, at least lamella ring 20 facing the pressure side and lamella ring 24 facing the environment side are biased against working diameter 40 and at least one lamella ring 22 arranged axially between lamella rings 20, 24 is biased against the bottom of annular groove 16.

Figure 6:
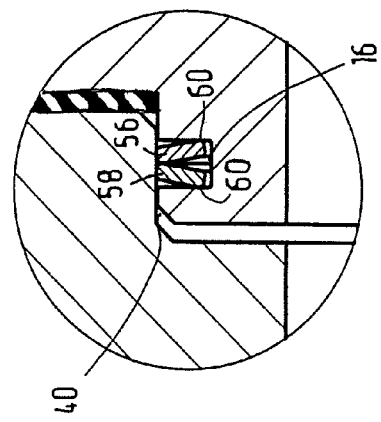
FIG. 6 is an enlarged partial cross-section detail of another embodiment showing a lamella ring, according to the present disclosure.

FIG. 6 shows another illustrative embodiment, according to the present disclosure, in which, instead of three double-turn lamella rings 20, 22, 24, only one double-turn lamella ring 48 biased against working diameter 40 is held in annular groove 16 with its width adapted to ensure a small axial play.

Figure 7:
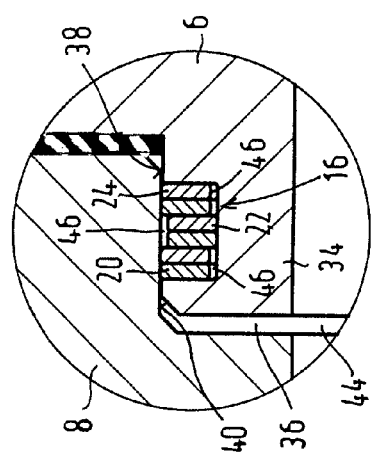
FIG. 7 is an enlarged partial cross-section detail of another embodiment showing a lamella ring, according to the present disclosure.

FIG. 7 illustrates another illustrative embodiment, according to the present disclosure, in which, instead of three double-turn lamella rings 20, 22, 24, three single-turn lamella rings 50, 52, 54 of a band of steel, or other metal, of constant width extending in one plane are held in annular groove 16. Each single-turn lamella ring 50, 52, 54 has an abutment opening between its free ends allowing a bias against working diameter 40 to be adjusted (not shown). The three single-turn lamella rings 50, 52, 54 are, therefore, all outside-biased lamella rings biased against working diameter or radially inner circumferential surface 40 of recess 36 of tube 8.

Figure 8:
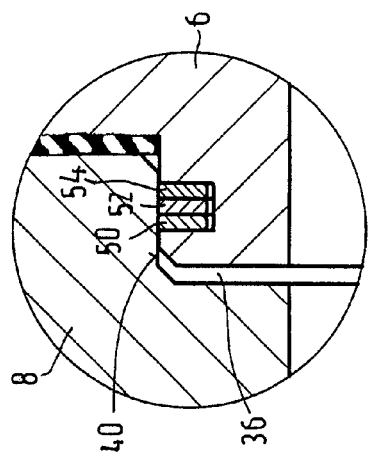
FIG. 8 is an enlarged partial cross-section detail of another embodiment showing a lamella ring, according to the present disclosure.

FIG. 8 shows another illustrative embodiment, according to the present disclosure, in which two single-turn conical lamella rings 56, 58 are biased radially toward the outside of a steel band conically formed in the manner of a disk spring. Rings 56, 58 are arranged in annular groove 16 in an axially opposing relationship with respect to their conical form. Due to an inclination of conical lamella rings 56, 58, the edges of the steel band, as sealing edges 60, sealingly engage the surfaces of annular groove 16.

The present disclosure is not limited to the illustrative embodiments described above. Further types of lamella rings and combinations of different lamella rings are also conceivable in a single annular groove.

For example, in accordance with another embodiment not shown in the Figures, the two tubes 6, 8 can have an axial recess 36, which is engaged by a separate ring, symmetrical with respect to its center plane, and which is provided with two annular grooves axially arranged adjacent to each other and on the same diameter. The one annular groove is associated with the working diameter of one of the tubes and the other annular groove will be associated with the other tube. In this embodiment, ends of the tubes could advantageously be manufactured as standardized components.

Although the present disclosure has been described and illustrated in detail, it is to be clearly understood that this is done by way of illustration and example only and is not to be taken by way of limitation. The scope of the present disclosure is to be limited only by the terms of the appended claims.

I claim:

1. A flanged joint for a pressurized medium, the flanged joint comprising:
    a first component and a second component each component including a facing flange surface projecting from the component and facing the facing flange surface of the other component, and each component having an interior portion configured to guide or store a pressurized medium;
    at least one flat gasket held between and contacting the facing flange surfaces of the first and second components;
    an annular groove and a working diameter radially opposing the annular groove, the annular groove being located between the interior portion and the at least one flat gasket; and
    at least one thin, flat lamella ring held in the annular groove and biased, without a gap, against the working diameter, the at least one lamella ring being arranged upstream of the at least one flat gasket in a direction of a pressure difference between a pressure side of the flanged joint and an environmental side of the flanged joint.

2. The flanged joint according to claim 1, wherein the at least one lamella ring is held in the annular groove with little axial play.

3. The flanged joint according to claim 1, wherein the at least one lamella ring is arranged in the annular groove parallel to a plane of flange surfaces of the at least one flat gasket.

4. The flanged joint according to claim 1, wherein the at least one lamella ring includes a plurality of lamella rings arranged axially in series.

5. The flanged joint according to claim 4, wherein the plurality of lamella rings includes at least one lamella ring facing a pressure side and at least one lamella ring facing an environment side and those rings being biased against the working diameter, and the plurality of lamella rings includes at least one lamella ring biased against a bottom of the annular groove and axially arranged between the at least one lamella ring facing the pressure side and the at least one ring facing the environment side.

6. The flanged joint according to claim 1, wherein the at least one lamella ring includes a single-turn lamella ring with an axial abutment opening of a steel band extending in one plane.

7. The flanged joint according to claim 1, wherein the at least one lamella ring is a single-turn lamella ring of a steel band formed in a manner and form of a disk spring.

8. The flanged joint according to claim 7, wherein the single-turn lamella ring includes at least a pair of lamella rings having a conical form and axially opposing each other with respect to their conical form.

9. The flanged joint according to claim 1, wherein the at least one lamella ring is a double-turn lamella ring of a metal band of constant width, and ends of double-turns of the ring protrude toward an inside or toward an outside in a relaxed state of the double-turn lamella ring, such protrusion departing from a circular form provided by a remainder of the double-turn lamella ring, and the ends are in alignment with the circular form of the double-turn lamella ring in a biased state.

10. The flanged joint according to claim 9, wherein the metal band is a steel band.

11. The flanged joint according to claim 1, wherein the first and second components include a radial overlapping area such that one of the components includes an axially protruding annular collar engaging a complementary, annular recess of the other component, the other component having an inner circumferential surface forming the working diameter.

12. The flanged joint according to claim 11, wherein the annular groove opens toward an environment side and is formed in the axially protruding annular collar.

* * * * *